United States Patent
Fleischmann et al.

(10) Patent No.: US 9,354,713 B2
(45) Date of Patent: May 31, 2016

(54) METHOD FOR RETRIEVING A DATA POINT OF A SWITCH

(75) Inventors: Thomas Fleischmann, Roethenbach (DE); Stefan Widmann, Freudenberg (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 0 days.

(21) Appl. No.: 13/818,821

(22) PCT Filed: Aug. 15, 2011

(86) PCT No.: PCT/EP2011/064039
§ 371 (c)(1),
(2), (4) Date: Feb. 25, 2013

(87) PCT Pub. No.: WO2012/025420
PCT Pub. Date: Mar. 1, 2012

(65) Prior Publication Data
US 2013/0185456 A1 Jul. 18, 2013

(30) Foreign Application Priority Data
Aug. 27, 2010 (DE) .......................... 10 2010 036 287

(51) Int. Cl.
*G06F 3/00* (2006.01)
*G06F 13/00* (2006.01)
*G06F 3/02* (2006.01)
*H01H 9/16* (2006.01)
*H01H 71/04* (2006.01)

(52) U.S. Cl.
CPC ................. *G06F 3/02* (2013.01); *H01H 9/167* (2013.01); *H01H 71/04* (2013.01); *H01H 2300/03* (2013.01); *Y02B 90/224* (2013.01); *Y04S 20/14* (2013.01)

(58) Field of Classification Search
CPC ....... G06F 7/24; G06F 13/385; G06F 13/387; G06F 7/02; G06F 7/10
USPC ............................. 710/4, 9, 11, 100, 316, 360
See application file for complete search history.

(56) References Cited

U.S. PATENT DOCUMENTS

| 6,400,547 | B1 | 6/2002 | Pohl |
| 7,793,017 | B2* | 9/2010 | Gehring et al. ................. 710/63 |
| 8,005,953 | B2* | 8/2011 | Miloushev .......... G06F 11/1076 709/214 |
| 8,027,272 | B2* | 9/2011 | Ramachandran ..... H04W 24/04 370/254 |
| 8,032,668 | B2* | 10/2011 | McClure ............. H04L 12/4135 701/24 |
| 8,098,766 | B2* | 1/2012 | Wenske ................. H04B 17/20 370/395.62 |
| 8,117,361 | B2* | 2/2012 | De Peuter et al. .............. 710/68 |
| 8,468,282 | B2* | 6/2013 | Awata ........................... 710/113 |
| 2002/0199041 | A1* | 12/2002 | Koseki .................. G11B 20/10 710/36 |
| 2004/0196010 | A1 | 10/2004 | Dohnal et al. |
| 2006/0158175 | A1 | 7/2006 | Mori et al. |
| 2007/0043694 | A1* | 2/2007 | Sawafta et al. .................... 707/1 |
| 2008/0004726 | A1* | 1/2008 | Gehring et al. ................. 700/83 |
| 2008/0005406 | A1* | 1/2008 | Odom et al. .................... 710/58 |
| 2008/0136567 | A1 | 6/2008 | Chelloug |
| 2009/0161740 | A1 | 6/2009 | Wenske |
| 2009/0217755 | A1 | 9/2009 | Hollander et al. |
| 2010/0121999 | A1 | 5/2010 | Isenmann et al. |
| 2012/0041576 | A1* | 2/2012 | Mikkelsen ........... G05B 19/409 700/80 |

FOREIGN PATENT DOCUMENTS

| CN | 101278473 A | 10/2008 |
| DE | 19711795 A1 | 9/1998 |
| DE | 10008560 A1 | 8/2001 |
| DE | 19758765 B4 | 7/2004 |
| EP | 1465221 A1 | 10/2004 |
| EP | 1873597 A1 | 1/2008 |
| EP | 2187571 A1 | 5/2010 |
| JP | 2010102519 A | 5/2010 |

OTHER PUBLICATIONS

International Search Report PCT/ISA/210 for International Application No. PCT/EP2011/064039 Dated on Nov. 29, 2011.
German Search Report for German Patent Publication No. 10 2010 036 287.5 Dated Nov. 30, 2010.
Chinese Office Action dated Aug. 26, 2014 for corresponding Chinese Application No. 2011800405267.

* cited by examiner

*Primary Examiner* — Idriss N Alrobaye
*Assistant Examiner* — Getente A Yimer
(74) *Attorney, Agent, or Firm* — Harness, Dickey & Pierce, P.L.C.

(57) ABSTRACT

A method is disclosed for retrieving a data point (operating data) of a switch via a device which does not recognize the data point of the switch and which can only retrieve such data points of a switch. The device is connected to the switch via a data connection for retrieval. In an embodiment, the switch has a data set in which the data point is described including the use of said data point. The device retrieves the data set during the data connection and extracts at least the description and the use of the data point of the switch from the data set. The device retrieves said data point that is recognized by the device at least for the duration of the data connection and processes said data point using the extracted description and use.

6 Claims, No Drawings

METHOD FOR RETRIEVING A DATA POINT OF A SWITCH

PRIORITY STATEMENT

This application is the national phase under 35 U.S.C. §371 of PCT International Application No. PCT/EP2011/064039which has an International filing date of Aug. 15, 2011, which designated the United States of America and which claims priority to German patent application number DE 10 2010 036 287.5 filed Aug. 27, 2010, the entire contents of each of which are hereby incorporated herein by reference.

FIELD

At least one embodiment of the invention generally relates to a method for retrieving a data point of a switch.

BACKGROUND

It is known practice to use circuit-breakers, which respectively protect downstream loads, in power distribution installations. In order to retrieve data points (operating data) of the switches, the latter are connected to a test device (generally: a correspondingly suitable device) via a data connection. In this case, the switch is used as the data source and the test device is used as the data sink. In order to retrieve data points of the switch, the data points must be known to the test device. Firmware updates often result in the switches having new functionalities and thus new data points. If a new data point of the switch is not known to the test device, the latter can neither retrieve nor use the data point. Consequently, the retrieval of a new data point must be preceded by its disclosure. This may be effected, for example, by way of a firmware update of the test device.

SUMMARY

At least one embodiment of the invention makes it possible to retrieve the data points of a switch with little technical complexity.

A data record describes the data point including its use. It is made available for a device to retrieve the data record during a data connection between the device and the switch. A method is disclosed in at least one embodiment for extracting at least the description and use of the data point of the switch from the data record; retrieving the data point, which is known to the device at least for the duration of the data connection; and processing the data point using the extracted description and use.

DETAILED DESCRIPTION OF THE EXAMPLE EMBODIMENTS

A data record, describing a data point including its use, is made available for a device to retrieve the data record during a data connection between the device and the switch. A method is disclosed in at least one embodiment for extracting at least the description and use of the data point of the switch from the data record; and retrieving the data point, which is known to the device at least for the duration of the data connection.

The method of at least one embodiment further includes processing the data point using the extracted description and use. In this case, additional information (meta data) is thus made available to the device via the data record. This information relating to a data point (or generally a plurality of data points) comprises, inter alia, the data format, the identification number and possibly also the name of the data point under which the latter is intended to be displayed on a display, for example.

It is also possible to allocate a particular category and its position in the arrangement of switches (structure of the connected switches) to the data point. An expansion of the data points no longer requires the switch and the device to be provided with a firmware update. This dispenses with the amount of development, testing and work for these updates. The new data points can be adopted into existing evaluation and display systems by the device without a relatively large amount of effort for the user.

In at least one embodiment of the invention, a method is directed to retrieving operating data of a switch in the form of data points by way of a device connected to the switch via a data connection, as described in more detail below.

The switch is a circuit-breaker for low voltages which belongs to a power distribution system. The switch protects a plurality of loads from overload and short circuit. Four conductors, through each of which a current flows, run, together with the neutral conductor, through the three-pole switch.

When the switch is closed, contact elements of each phase in the form of contact pieces rest against one another and are separated from one another in order to open the switch. The separation of the contact elements is triggered by an electronic triggering unit having a microcontroller when a predefined current limit value is exceeded.

The operating data are stored as data points in the switch. The switch also has a data record which describes all data points of the switch, including their use.

For each data point, the description comprises the data format, the identification number and the name under which the data point is to be displayed. The data record also contains the position of the switch in the arrangement of switches.

A device can be connected to the switch via a data connection, the device being able to retrieve all data points of the switch which are known to the device. In order to also be able to retrieve the data points which are not known to the device, the device first of all retrieves the data record. In this manner, it also obtains the description and the use of the data points of the switch which were previously unknown to it, are now known and therefore can be retrieved by it. The description and use of each data point tell the device how the retrieved data points should be used at least during the data connection.

After the data connection has ended, only the data points which were also known to the device before the data connection are again known to the device. It goes without saying that it is also possible for the device to also memorize the data points which were disclosed to it via the data connection.

After a firmware update, on account of new functionalities, the switch has, for example, two new data points which are not known to the device but are contained in the new data record. As a result of the retrieval of the new data record, the device can also retrieve the new data points and use the latter according to the description. A firmware update is consequently no longer required.

The invention claimed is:
1. A method for retrieving a data point of an electrical switch, the electrical switch being connectable to a device via a data connection, the method comprising:
retrieving, via the device, a data record of the electrical switch during the data connection, the data record including a description and a use of the data point, wherein the electrical switch is part of an arrangement of electrical switches, and the data point indicates a cat- egory of the arrangement of switches and a position of the electrical switch in the arrangement of electrical switches;

extracting, via the device, at least the description and the use of the data point from the data record such the data point becomes known to the device;

retrieving, via the device, the known data point at least for the duration of the data connection; and processing, via the device, the known data point using the extracted description and the extracted use, wherein the retrieved data record further includes additional information, the additional information relating to a plurality of data points within the retrieved data record and including a data format and an identification number for each of the plurality of data points, and the additional information includes a name for at least some of the plurality of data points, the name being displayable on a display device.

2. The method of claim 1, further comprising:

retrieving, via the device, operating data of the electrical switch in the form of the plurality of data points.

3. The method of claim 1, wherein the electrical switch is a circuit breaker.

4. A device for retrieving a data point of an electrical switch, the electrical switch being connectable to the device via a data connection, the device being configured to:

retrieve a data record of the electrical switch during the data connection, the data record including a description and a use of the data point, wherein the electrical switch is part of an arrangement of electrical switches, and the data point indicates a category of the arrangement of switches and a position of the electrical switch in the arrangement of electrical switches;

extract at least the description and the use of the data point from the data record such the data point becomes known to the device;

retrieve the known data point at least for the duration of the data connection; and process the known data point using the extracted description and the extracted use, wherein the retrieved data record further includes additional information relating to a plurality of data points within the retrieved data record and including a data format and an identification number for each of the plurality of data points, and the additional information includes a name for at least some of the plurality of data points, the name being displayable on a display device.

5. The device of claim 4, further configured to:

retrieve operating data of the electrical switch in the form of the plurality of data points.

6. The device of claim 4, wherein the electrical switch is a circuit breaker.

* * * * *